Figure 1:
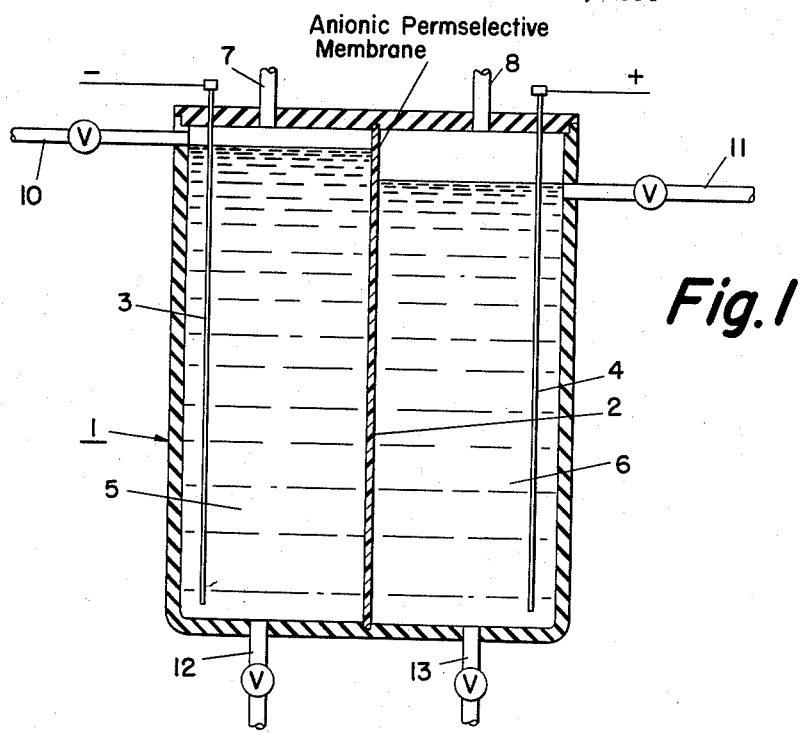
Figure 2:
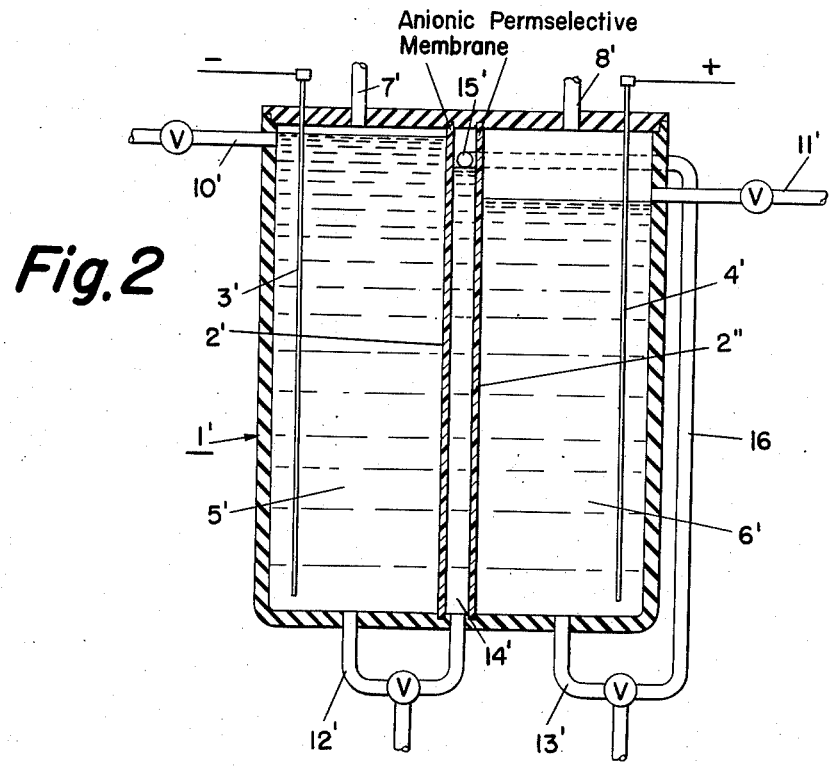

Oct. 22, 1957  G. W. BODAMER ET AL  2,810,686
ELECTROLYTIC TREATMENT OF WASTE SULFATE PICKLE LIQUOR
Filed Nov. 9, 1954

2,810,686
Patented Oct. 22, 1957

2,810,686

ELECTROLYTIC TREATMENT OF WASTE SULFATE PICKLE LIQUOR

George W. Bodamer, Cheltenham, Pa., and Collins Horner, Merchantville, N. J., assignors to Rohm & Haas Company, Philadelphia, Pa., a corporation of Delaware Application November 9, 1954, Serial No. 467,678

13 Claims. (Cl. 204—130)

This invention relates to spent pickle liquor which is obtained from the pickling or cleaning of iron and steel products and which contains sulfuric acid and dissolved iron salts. It relates to an electrolytic process of recovering metallic iron from such spent liquor and of regenerating sulfuric acid which can be used in subsequent pickling operations.

It is well known that huge volumes of spent pickle liquor—approaching a billion gallons a year—are obtained from the pickling of iron and steel objects. The problem of disposing of such large volumes of waste material has been given much serious consideration both in this country and abroad. An informative article which originated in England and which discusses the problem is found in The Water & Sanitary Engineer for October, 1952 (pp. 213–219). Another comprehensive report is entitled "Disposal of Spent Sulfate Pickling Solutions" and has been published by the Ohio River Valley Sanitation Commission, (414 Walnut Street, Cincinnati 2, Ohio). And as was said elsewhere (U. S. Patent 2,662,812):

"The enormous quantities of spent pickle liquor which are produced in industry and the magnitude of the problem of its disposal or utilization are well known. To meet the problem of disposal of these corrosive and acidic liquors many procedures have been developed for reclamation of the waste liquors, the extraction of the iron content, and the recycling of regenerated liquor. Such processes, although furnishing partial solutions for this considerable problem, have not swept the industry because each of them is subject to one or more disadvantages, particularly one of the following: the costly need for evaporating large quantities of water often under the disadvantageous condition of precipitating a difficultly manageable slurry, the necessity of handling and circulating sulfuric acid solution of highly corrosive concentrations, and the circumstance of precipitating a large proportion, if not all, of the iron in the waste liquors as copperas, $FeSO_4.7H_2O$, a salt which can be treated only with difficulty for recovery of its sulfur in the regeneration of the acid for recycling to the pickling baths."

The main object, therefore, of this invention is to provide a commercially feasible electrolytic process for converting spent sulfate pickle liquor into metallic iron and sulfuric acid, both of which have utility and value. Another object is to avoid the difficulties such as neutralization, precipitation, lagooning and the like which were experienced heretofore in the disposal of the waste acidic liquors. Still another object is to employ electrical rather than chemical means. Other objects will become evident to those skilled in the art from the following discussion and description of the instant invention.

Broadly, the process of this invention comprises electrolytically depositing metallic iron and simultaneously regenerating sulfuric acid by passing a direct electric current through an electrolysis cell which contains an anode compartment and a cathode compartment separated by an anionic permselective membrane or diaphragm, the anode compartment containing sulfuric acid and the cathode compartment containing spent pickle liquor.

This invention may be better understood from a consideration of the accompanying drawing. In the drawing, Figure I is a diagrammatic or schematic representation in cross-section of a suitable electrolysis cell divided into an anode compartment and a cathode compartment by means of an anionic permselective membrane. Figure II is a cross-sectional representation of another electrolysis cell which can be used and which contains three compartments, one an anode compartment, the second a cathode compartment, and the third an intermediate compartment which is separated from the anode and the cathode compartments by means of two anionic permselective membranes.

Referring now to Figure I, the process of this invention can be discussed in its simplest elements. In Figure I, the numeral 1 represents a conventional acid-resistant container or vessel made of a material such as a phenolformaldehyde resin or poly(methyl methacrylate) or hard rubber. This vessel is divided into two compartments 5 and 6 by means of an anionic permselective membrane 2. Compartment 6 is an anode compartment by virtue of containing anode 4, while compartment 5 is a cathode compartment because it contains cathode 3. Numerals 7 and 8 represent openings through which gases which are generated may escape. In the operation of the cell, anode 4 and cathode 3 are connected to a source of a direct electric current not shown. The catholyte in cathode compartment 5 is spent sulfate pickle liquor of commerce which contains sulfuric acid and dissolved ferrous sulfate. By spent sulfate pickle liquor of commerce we mean the liquor in exactly the condition it had after it was employed in pickling iron or steel, etc., and without any special pre-treatment having been given it prior to application of the electrolytic process of this invention. Obviously the ratios and amounts of sulfuric acid and ferrous sulfate in this spent pickle liquor will vary from mill to mill and will also depend upon how long the pickle liquor was used in a pickling bath. Ordinarily, the spent pickle liquor will contain something of the order of 0.5% to 10% of sulfuric acid and 10% or more of ferrous sulfate. The instant process is not, however, limited to the treatment of pickle liquor of any particular concentration. The anolyte in anode compartment 6 can be a solution of any electrolyte at the beginning of the electrolytic process, but because an object of this invention is to produce sulfuric acid in the anode compartment, the most practical procedure is to employ a dilute solution of sulfuric acid as the anolyte. When an electrical potential is applied and a direct electric current is passed through the cell, sulfate ions in the cathode compartment 5 migrate toward the anode 4. They pass through the anionic permselective membrane 2 and enter anode compartment 6. Oxygen is liberated at the anode and escapes through outlet 8. Hydrogen ions form in the anolyte and consequently the concentration of sulfuric acid increases in the anode compartment. At the same time, hydrogen ions and ferrous ions in the catholyte migrate toward the cathode 3. Molecular hydrogen is liberated and escapes through outlet 7. The pH of the catholyte gradually rises; and when it reaches approximately 1.8, metallic iron plates out on the cathode. As a result, metallic iron is recovered in the cathode compartment, sulfuric acid is formed in the anode compartment, and, in addition, hydrogen and oxygen are liberated. The regenerated sulfuric acid is suitable for use in subsequent pickling operations.

Without the presence of the anionic permselective membrane, the electrolysis of spent pickle liquor has no practical utility. In the absence of the membrane, the hydrogen ions which form in the anolyte would migrate to the cathode and be liberated as molecular hydrogen. This would occur to the exclusion of the plating out of iron. In effect, such a process would merely amount to the electrolytic decomposition of water into hydrogen and oxygen, without the recovery of iron or the regeneration of sulfuric acid. In the instant process, however, the presence of the anionic permselective membrane restrains the migration of the generated hydrogen ions from the anode compartment into the cathode zone, since being of the anionic type, the membrane permits the ready passage through it of anions but substantially prevents the passage of cations.

The anionic permselective membranes which are employed in the process of this invention are pellicles, sheets or diaphragms which are acid-resistant. They are anionic in that they allow anions to pass freely through them while at the same time preventing—or at least restraining—the passage of cations through them. They also prevent the free passage of liquids; and consequently are essentially non-porous. Such membranes are known and some are available commercially. Those which are currently preferred contain anion-exchange resins, such as the membranes described in U. S. Patent 2,636,851. Others which are particularly suitable because they are rugged, tough and durable are described in U. S. Patent 2,681,319. These last are made by dispersing fine discrete particles of anion-exchange resins in a matrix of a flexible and strong material, such as polyethylene or vulcanized rubber.

The process of this invention can be carried out batchwise or continuously. In the case of continuous operation, all that is required is that the anolyte and catholyte be circulated through the anode and cathode compartments respectively. For this purpose, inlets and outlets 10, 11, 12, and 13, as shown in Figure I, are provided. While the direction of flow in the compartments may be in any direction, it is recommended that the flow in the cathode compartment be downward and the flow in the anode compartment be upward.

As the process continues, the concentration of hydrogen ions and sulfate ions increases in the anode compartment and consequently the conductivity of the anolyte rises. At the same time, the concentration—and hence, the conductivity—of the catholyte falls as hydrogen is liberated, as sulfate ions migrate from the cathode compartment, and as metallic iron is deposited. Ultimately, the resistance of the catholyte reaches the point where the consumption of electric power which is required is objectionably high and costly. Also when a large difference in concentration of the anolyte and catholyte is reached, the number of hydrogen ions which back-migrate through the permselective membrane also increases sharply, since even the best anionic membranes which are available are not "ideal" and are not completely impermeable to cations. Particularly at high temperatures some diffusion of the solutions also takes place.

In view of the diffusion of hydrogen ions, it is preferred to employ a modification of the basic process described above. This modification comprises carrying out the electrolysis until most—but not all—of the iron in the spent pickle liquor has been plated out and until most—but not all—of the sulfate ions have migrated into the anode compartment. At such a point before the electrolysis is complete, both the anolyte and catholyte are removed from the electrolysis cell. The removed anolyte, with its increased concentration of sulfuric acid, is suitable for use as new pickling solution. Thereafter a new charge of spent pickle liquor is run into the cathode compartment; and the partially electrolyzed catholyte which was previously removed from the cell is run into the anode compartment where it serves as anolyte in the next electrolysis step.

Here again, this modified procedure can be carried out continuously. In the continuous adaptation of the process, spent pickle liquor is flowed slowly and continuously downward through the cathode compartment where it is partially electrolyzed. The partially electrolyzed catholyte is then continuously removed from the bottom of the cathode compartment and is next run slowly through the anode compartment in either direction, but preferably upward. The acid solution which is continuously removed from the anode compartment is then available for use as new pickling liquor. A most convenient way of carrying out this continuous process is to first connect openings 12 and 13 in Figure I by means of a pipe, hose or other suitable conduit, and then to introduce continuously spent pickle liquor through opening 10, run it downward through cathode compartment 5, remove the electrolyzed solution through opening 12, introduce it into anode compartment 6 through opening 13, remove the resultant acidic solution through opening 11, and finally charge it to the pickling baths. Obviously this circulation can be done by means of pumps. But it can also be done without pumps by merely having the level of the catholyte sufficiently higher than the level of the anolyte, i. e., by having opening 10 higher than opening 11.

By either the batch process or the continuous method, the spent pickle liquor is electrolyzed in the cathode compartment until the content of ferrous sulfate is sufficiently reduced—preferably to a concentration of the order of 1% to 5%. When the effluent from the cathode compartment is next employed as anolyte, the ferrous salts are oxidized to the ferric state. The amount of ferric salt which remains in the regenerated sulfuric acid solution which is removed from the anode compartment is not objectionable. In fact, there is evidence that a small amount of ferric iron is actually beneficial in pickling operations.

Still another embodiment of this invention which is more economical than those described above can be understood from a consideration of Figure II of the drawing. In that figure, the numeral 1' represents an acid-resistant container which is divided into three compartments, 5', 6', and 14'. Compartment 5' contains cathode 3' and is therefore a cathode compartment while compartment 6' contains the anode 4' and is consequently the anode compartment. The other compartment 14' is referred to herein as the center compartment; and it is separated from the compartments 5' and 6' by two anionic permselective membranes, 2' and 2", both of which contain anion-exchange resins. In the operation of the cell, spent pickle liquor is employed as the catholyte while dilute sulfuric acid is used as anolyte. The solution in the center compartment is also a dilute solution of sulfuric acid. In commercial production, it is much preferred that the solutions in the center compartment and in the anode compartment be solutions of spent pickle liquor which have been formerly partially electrolyzed in the cathode compartment. The migration of the ions and the electrochemical reactions which take place in the anode and cathode compartments are the same as are described above. In the center compartment, sulfate ions enter from the cathode compartment 5' by passing through one of the anionic membranes 2', migrate across the center compartment 14', pass through the second permselective membrane 2" and enter the anode compartment 6'. Thus the concentration of the solution in the center compartment remains essentially unchanged. Ferrous ions and hydrogen ions originally present in the electrolyte solution in the center compartment and any additional hydrogen ions which may have back-migrated from anode compartment 6' through membrane 2" are restrained from entering cathode compartment 5' by membrane 2'.

Consequently the over-all back-migration of hydrogen ions is minimized.

While the cell shown in Figure II can be operated batch-wise, it is much preferred that the operation be carried out continuously. In the preferred continuous process, spent pickle liquor is run continuously into cathode compartment 5' through an inlet 10' where it is electrolyzed when an electrical potential is impressed. Iron is deposited and hydrogen is liberated. The electrolyzed catholyte is continuously withdrawn from cathode chamber 5' through conduit 12' and is continuously introduced into center compartment 14' preferably at the bottom of the chamber. At the same time, the electrolyte solution is removed from the other end through outlet 15' which is preferably located near the top of compartment 14'. A conduit, 16', carries the effluent continuously from the center compartment to the anode compartment 6' where it is introduced continuously through opening 13'. Simultaneously, the electrolyzed anolyte is removed continuously through opening 11'; and this effluent can be used as fresh pickle liquor. Here again, the solutions can be pumped through the compartments; or pumps can be eliminated by having the head of the solution in the center compartment lower than the head in the cathode compartment and higher than that in the anode compartment.

During the electrolysis, the temperature of the solutions within the electrolysis cells rises depending upon the current density and concentrations of the electrolytic solutions. As a matter of fact, it is more advantageous and economical to operate at elevated temperatures; and an operating temperature within the cell of about 60° to about 95° C. is preferred and recommended. Obviously higher temperatures can be employed together with super-atmospheric pressure. At atmospheric pressure and high current densities, of the order of 90 amperes per square foot of surface of the membrane, it is advisable to employ cooling means in order to prevent the solutions from boiling. For this purpose cooling coils through which water is circulated may be placed in the various compartments; and the heated water can in turn be used to preheat the original spent pickle liquor, especially in the continuous processes. Alternatively spent pickle liquor can be circulated through the coils and thus be preheated.

Although the current densities may be varied, it is recommended that a current density of about 50 to about 150—and preferably from 70 to 90—amperes per square foot of area of the anionic membrane which is immersed in electrolyte be employed, or per square foot of area of either electrode, recalling that the areas of the immersed membranes and the electrodes in the cells are approximately the same.

Various kinds of electrodes can be employed. Since the anolyte is strongly acidic and oxidative, it is advisable to use an anode which is acid-resistant such as platinum, lead or lead alloys typified by antimonial lead. Generally speaking, a wider variety of cathodes are operable such as those made from iron, steel, stainless steel, aluminum, titanium, nickel and graphite.

The electrolysis cells which are employed in this invention can be varied as to size, shape, closures, construction materials, controls, size of individual compartments, reinforcement of the membranes, heat-exchange devices, conduits, location of inlets and outlets, embellishments et cetera without departing from the spirit of this invention. What is essential to the instant process is that a cell be employed which has a cathode compartment containing a cathode and spent pickle liquor as catholyte, an anode compartment containing an anode and an electrolyte solution—preferably a solution of sulfuric acid—and that the anode compartment be separated from the cathode compartment by means of an anionic permselective membrane which contains an anion-exchange resin, said membrane or diaphragm serving as a barrier between the anode and cathode compartments.

The following examples, in which all parts are by weight unless otherwise indicated, serve to further illustrate the process of this invention:

*Example I*

A two-compartment cell made of Plexiglas and essentially like that shown in Figure I of the drawing was employed. The anionic permselective membrane which was used to divide the cell into an anode compartment and a cathode compartment was known to have been made by thoroughly dispersing about 65 parts by weight of a finely divided, commercially available, strongly basic, quaternary ammonium, anion-exchange resin in about 35 parts of polyethylene and forming a sheet of the mixture. Such anionic permselective membranes, which are commercially available (Amberplex Ion Permeable Membranes), are described in U. S. Patent 2,681,319. The anode was made of 9% antimonial lead and the cathode was type 316 stainless steel. A total of 1167 parts of a spent sulfate pickle liquor containing 15.6% ferrous sulfate and 3.9% sulfuric acid was charged to the cathode compartment while 690 parts of 3% sulfuric acid was charged to the anode compartment. A direct electric current was passed through the cell over a period of 3.1 hours at a cathode current density of 90 amperes per square foot. At the start, the electrolyte solutions were at room temperature (23° C.) but after 1.75 hours the temperature had risen to 75° C. It was maintained at 75° to 82° C. thereafter by means of cooling coils which were immersed in the anode and cathode compartments. The voltage was adjusted, when necessary, at 15 minute intervals and varied from about 4 volts to 5.2 volts. During the electrolysis, 4.76 parts of hydrogen was liberated at the cathode, 62 parts of iron was deposited on the cathode, and 55.5 parts of oxygen was liberated at the anode. At the same time, 138.8 parts of sulfate ions migrated into the anode compartment and 126.4 parts of water was electrokinetically transported from the cathode compartment to the anode compartment. A total of 51.7 parts of water was lost by evaporation, 20 parts from the cathode compartment and 31.7 parts from the anode compartment. At the end of the operation the catholyte weighed 765 parts and contained 1.8% ferrous sulfate and 0.35% sulfuric acid, while the final anolyte weighed 918 parts and contained 17.7% sulfuric acid. This solution of sulfuric acid was entirely satisfactory for use in iron pickling baths.

*Example II*

In this case the electrolysis of spent pickle liquor was carried out continuously in the two-compartment cell described in Example I. The only alteration in the cell was the connection, by means of a rubber hose, of the opening at the bottom of the cathode compartment (12 in Figure I) with the opening at the bottom of the anode compartment (13 in Figure I). Hot spent pickle liquor containing 15.5% ferrous sulfate and 4% sulfuric acid was employed as catholyte while at the outset a hot 3% solution of sulfuric acid was used as the anolyte. After the start of the operation, spent pickle liquor was passed into the cathode compartment at the rate of 477 parts per hour. At the same time the effluent from the bottom of the cathode compartment was passed upward through the anode compartment and out near the top (through opening 11 of Figure I). The rate of flow was so adjusted that the amount of residual dissolved iron was equivalent to 3% ferric sulfate in the effluent from the anode compartment. The anolyte and catholyte were maintained at a temperature of 90° C. throughout. The level of the catholyte was 1.5 inches higher than that of the anolyte in order to insure flow through the cell. A cathode current density was maintained at 90 amperes per square foot and the voltage varied from about 5 to 6 volts. As stated above, the spent pickle liquor was introduced into the cathode compartment at the rate of 477 parts per hour while the effluent from the cathode compartment, containing about 2.85% ferrous sulfate and 1.7% sulfuric acid was passed into the anode compartment at the rate of 325 parts per hour. Iron was deposited at the rate of 23.8 parts per hour while hydrogen and oxygen were liberated at respective rates of 1.7 parts and 19 parts per hour. Twenty-eight parts of water was lost each hour, 14 from each compartment. A total of 54.4 parts of sulfate ions migrated from the cathode compartment to the anode compartment per hour and during the same time 58.1 parts of water was transported to the anode compartment. The effluent from the anode compartment was collected at the rate of 404.5 parts per hour. This contained 3% ferric sulfate and 14.4% sulfuric acid and was entirely suitable for pickling iron.

*Example III*

In this instance a three-compartment cell like that shown in Figure II was used. Both of the anionic permselective membranes were identical and had the same composition as the membrane described in Example I above. Spent pickle liquor containing 15.5% ferrous sulfate and 4% sulfuric acid and pre-heated to 85° C. was passed continuously into the top of the cathode compartment. The effluent from the bottom of the cathode compartment then passed continuously into the center compartment at the bottom. Effluent was removed continuously from the top of the center compartment and was introduced into the anode compartment at the bottom. Thereafter the solution flowed up through the anode compartment and out at the top where it was recovered as an acid solution entirely suitable for use in pickling baths. In order to provide flow, the level of the catholyte was maintained at a height of one inch above the level of the solution in the center compartment; and the level in the center compartment was maintained at a height of one inch above the level of the anolyte. The electrolysis process was carried out at a cathode current density of 90 amperes/square foot; and the temperatures of the solutions in the anode and cathode compartments were maintained at approximately 85° C. The spent pickle liquor was fed into the cathode compartment at the rate of 517 ml./hour and the regenerated pickle liquor, containing 14% sulfuric acid and 3% ferric sulfate was recovered at the rate of 481 ml./hour. Iron was deposited on the cathode at the rate of 30.3 grams/hour while hydrogen and oxygen were liberated at respective rates of 1.4 grams and 18.9 grams per hour. Any loss was due to the evaporation of water.

It is also within the scope of this invention to use a plurality of cells in the customary cascade fashion.

Cost determinations have shown that the instant process is cheaper to operate than older chemical methods of disposing of waste spent pickle liquor.

We claim:

1. An electrolytic process for the regeneration of spent iron pickle liquor of commerce containing dissolved ferrous sulfate and sulfuric acid which comprises passing a direct electric current through an electrolysis cell which is divided by means of an anionic permselective diaphragm into an anode compartment and a cathode compartment; said anode compartment containing an anode and an aqueous anolyte comprising sulfuric acid, and said cathode compartment containing a cathode and spent iron pickle liquor as the catholyte; and continuing the passage of said current after the pH of the catholyte has reached about 1.8, whereby metallic iron is deposited on said cathode and sulfuric acid is formed in said anode compartment.

2. The process of claim 1 wherein the anolyte and catholyte have temperatures from about 60° C. to about 95° C.

3. An electrolytic process for the regeneration of spent iron pickle liquor of commerce containing dissolved ferrous sulfate and sulfuric acid which comprises passing a direct electric current through an electrolysis cell which is divided by means of an anionic permselective membrane into an anode compartment and a cathode compartment; said anode compartment containing an anode and an anolyte which is a partially electrolyzed spent pickle liquor containing sulfuric acid and from about 1% to about 5% ferrous sulfate, and said cathode compartment containing a cathode and spent pickle liquor as the catholyte; and continuing the electrolysis until the dissolved ferrous sulfate in said catholyte is reduced to a value from about 1% to about 5%.

4. The process of claim 3 in which the anolyte and catholyte are at temperatures from about 60° C. to about 95° C.

5. An electrolytic process for the regeneration of spent iron pickle liquor of commerce containing dissolved ferrous sulfate and sulfuric acid which comprises passing a direct electric current through an electrolysis cell which is divided by means of an anionic permselective membrane into an anode compartment which contains an anode and an aqueous solution comprising sulfuric acid as anolyte and a cathode compartment which contains a cathode and spent pickle liquor; continuing the passage of current while continuously feeding spent iron pickle liquor into one end of said cathode compartment and simultaneously and continuously removing partially electrolyzed catholyte containing from about 1% to about 5% ferrous sulfate as effluent from the other end of said cathode compartment, and simultaneously and continuously feeding said effluent from the cathode compartment into one end of the anode compartment while simultaneously and continuously removing anolyte from the other end of said anode compartment.

6. The process of claim 5 in which said spent pickle liquor of commerce is passed downward through said cathode compartment while said effluent from said cathode compartment is passed upward through said anode compartment.

7. The process of claim 5 in which the anolyte and the catholyte are at temperatures from about 60° C. to about 95° C.

8. An electrolytic process for the regeneration of spent iron pickle liquor of commerce containing dissolved ferrous sulfate and sulfuric acid which comprises passing a direct electric current through an electrolysis cell which is divided by means of two permselective membranes which are only of the anionic type into an anode compartment, a cathode compartment and a center compartment; said anode compartment containing an anode and an aqueous anolyte comprising sulfuric acid, said cathode compartment containing a cathode and said spent iron pickle liquor as the catholyte, and said center compartment containing an aqueous electrolyte solution comprising sulfuric acid; and continuing the passage of said current after the pH of the catholyte has reached about 1.8, whereby metallic iron is deposited on said cathode and sulfuric acid is formed in said anode compartment.

9. The process of claim 8 in which the anolyte and catholyte are at temperatures from about 60° C. to about 95° C.

10. An electrolytic process for the regeneration of spent iron pickle liquor of commerce containing dissolved ferrous sulfate and sulfuric acid which comprises passing a direct electric current through an electrolysis cell which is divided by means of two permselective membranes which are only of the anionic type into an anode compartment which contains an anode and an aqueous solution comprising sulfuric acid as anolyte, a center compartment containing an aqueous electrolyte solution comprising sulfuric acid, and a cathode compartment containing a cathode and spent pickle liquor as catholyte; continuously feeding spent iron pickle liquor into one end of said cathode compartment and simultaneously and continuously removing partially electrolyzed catholyte containing from about 1% to about 5% ferrous sulfate as effluent from the other end of said cathode compartment, and simultaneously and continuously flowing said effluent from said cathode compartment through said center compartment, and simultaneously and continuously feeding the effluent from the center compartment into one end of said anode compartment while simultaneously and continuously removing anolyte from the other end of said anode compartment.

11. The process of claim 10 in which the anolyte and catholyte are at temperatures from about 60° C. to about 95° C.

12. The process of claim 11 in which said spent pickle liquor is passed downward through said cathode compartment and upward through said center compartment and said anode compartment.

13. An electrolytic process for the regeneration of spent iron pickle liquor of commerce containing dissolved ferrous sulfate and sulfuric acid, which comprises passing a direct electric current through an electrolysis cell which is sub-divided into at least an anode compartment and a cathode compartment by at least one permselective membrane, whatever the number of membranes employed being only of the anionic type; said anode compartment containing an anode and an aqueous anolyte comprising sulfuric acid, said cathode compartment containing a cathode and said spent iron pickle liquor as the catholyte; and continuing the passage of said current after the pH of the electrolyte has reached about 1.8, whereby metallic iron is deposited on said cathode and sulfuric acid is formed in said anode compartment.

References Cited in the file of this patent
UNITED STATES PATENTS

| | | |
|---|---|---|
| 1,954,664 | Cain | Apr. 10, 1934 |
| 2,583,098 | Heise et al. | Jan. 22, 1952 |
| 2,636,851 | Juda et al. | Apr. 28, 1953 |

OTHER REFERENCES

"Amberplex Ion Permeable Membranes," by Rohm & Haas Company, Philadelphia, Pa. (1952), pages 10–12.

"Industrial & Engineering Chemistry," vol. 47 (1955), pages 67–70, article by Bramer et al.